US008655856B2

(12) United States Patent
Paknad et al.

(10) Patent No.: US 8,655,856 B2
(45) Date of Patent: Feb. 18, 2014

(54) METHOD AND APPARATUS FOR POLICY DISTRIBUTION

(75) Inventors: Deidre Paknad, Palo Alto, CA (US); Pierre Raynaud-Richard, Redwood City, CA (US); Andrey Pogodin, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 12/892,658

(22) Filed: Sep. 28, 2010

(65) Prior Publication Data

US 2011/0153579 A1    Jun. 23, 2011

Related U.S. Application Data

(63) Continuation-in-part of application No. 12/645,351, filed on Dec. 22, 2009, now Pat. No. 8,250,041.

(51) Int. Cl.
G06F 17/00 (2006.01)

(52) U.S. Cl.
USPC ............................ 707/694; 707/756; 707/794

(58) Field of Classification Search
USPC .......................... 707/656, 662, 756, 794, 694
See application file for complete search history.

(56) References Cited

U.S. PATENT DOCUMENTS

| 5,313,609 | A | 5/1994 | Baylor et al. |
|---|---|---|---|
| 5,355,497 | A | 10/1994 | Cohen-Levy |
| 5,608,865 | A | 3/1997 | Midgely et al. |
| 5,701,472 | A | 12/1997 | Koerber et al. |
| 5,875,431 | A | 2/1999 | Heckman et al. |
| 5,903,879 | A | 5/1999 | Mitchell |
| 5,963,964 | A | 10/1999 | Nielsen |
| 6,049,812 | A | 4/2000 | Bertram et al. |
| 6,115,642 | A | 9/2000 | Brown et al. |
| 6,128,620 | A | 10/2000 | Pissanos et al. |
| 6,151,031 | A | 11/2000 | Atkins et al. |
| 6,173,270 | B1 | 1/2001 | Cristofich et al. |
| 6,330,572 | B1 | 12/2001 | Sitka |
| 6,332,125 | B1 | 12/2001 | Callen et al. |
| 6,343,287 | B1 | 1/2002 | Kumar et al. |
| 6,401,079 | B1 | 6/2002 | Kahn et al. |
| 6,425,764 | B1 | 7/2002 | Lamson |
| 6,460,060 | B1 | 10/2002 | Maddalozzo, Jr. et al. |
| 6,539,379 | B1 | 3/2003 | Vora et al. |

(Continued)

FOREIGN PATENT DOCUMENTS

EP      2110781 A1    10/2009

OTHER PUBLICATIONS www.pss-systems.com; retrieved from www. Archive.org any linkage dated Dec. 8, 2005, 130 pages.

(Continued)

*Primary Examiner* — John E Breene
*Assistant Examiner* — Andalib Lodhi
(74) *Attorney, Agent, or Firm* — Shumaker & Sieffert, P.A.

(57) ABSTRACT

A computer apparatus and computer implemented method for policy distribution provides a Records Management System (RMS) that is configured for setting up and maintaining local record classification and disposition policies. An Enterprise Retention Management (ERM) application comprises a centralized workflow configured for managing retention policies for an entity. An application layer in the ERM comprises a propagation workflow that is configured for managing retention policy integration between the ERM and the RMS. The propagation workflow thus provides automated retention policy propagation from the ERM to the RMS.

36 Claims, 13 Drawing Sheets

(56) References Cited

U.S. PATENT DOCUMENTS

| | | | |
|---|---|---|---|
| 6,553,365 B1 | 4/2003 | Summerlin et al. |
| 6,607,389 B2 | 8/2003 | Genevie |
| 6,622,128 B1 | 9/2003 | Bedell et al. |
| 6,738,760 B1 | 5/2004 | Krachman |
| 6,805,351 B2 | 10/2004 | Nelson |
| 6,832,205 B1 | 12/2004 | Aragones et al. |
| 6,839,682 B1 | 1/2005 | Blume et al. |
| 6,944,597 B2 | 9/2005 | Callen et al. |
| 6,966,053 B2 | 11/2005 | Paris et al. |
| 6,976,083 B1 | 12/2005 | Baskey et al. |
| 6,981,210 B2 | 12/2005 | Peters et al. |
| 7,016,919 B2 | 3/2006 | Cotton et al. |
| 7,076,439 B1 | 7/2006 | Jaggi |
| 7,082,573 B2 | 7/2006 | Apparao et al. |
| 7,103,602 B2 | 9/2006 | Black et al. |
| 7,104,416 B2 | 9/2006 | Gasco et al. |
| 7,107,416 B2 | 9/2006 | Stuart et al. |
| 7,120,914 B1 | 10/2006 | Manthos et al. |
| 7,127,470 B2 | 10/2006 | Takeya |
| 7,146,388 B2 | 12/2006 | Stakutis et al. |
| 7,162,427 B1 | 1/2007 | Myrick et al. |
| 7,197,716 B2 | 3/2007 | Newell |
| 7,206,789 B2 | 4/2007 | Hurmiz et al. |
| 7,225,249 B1 | 5/2007 | Barry et al. |
| 7,233,959 B2 | 6/2007 | Kanellos et al. |
| 7,236,953 B1 | 6/2007 | Cooper et al. |
| 7,240,296 B1 | 7/2007 | Matthews et al. |
| 7,249,315 B2 | 7/2007 | Moetteli |
| 7,281,084 B1 | 10/2007 | Todd et al. |
| 7,283,985 B2 | 10/2007 | Schauerte et al. |
| 7,284,985 B2 | 10/2007 | Genevie |
| 7,292,965 B1 | 11/2007 | Mehta et al. |
| 7,333,989 B1 | 2/2008 | Sameshima et al. |
| 7,386,468 B2 | 6/2008 | Calderaro et al. |
| 7,433,832 B1 | 10/2008 | Bezos et al. |
| 7,451,155 B2 | 11/2008 | Slackman et al. |
| 7,478,096 B2 | 1/2009 | Margolus et al. |
| 7,496,534 B2 | 2/2009 | Olsen et al. |
| 7,502,891 B2 | 3/2009 | Shachor |
| 7,512,636 B2 | 3/2009 | Verma et al. |
| 7,558,853 B2 | 7/2009 | Alcorn et al. |
| 7,580,961 B2 | 8/2009 | Todd et al. |
| 7,594,082 B1 | 9/2009 | Kilday et al. |
| 7,596,541 B2 | 9/2009 | deVries et al. |
| 7,614,004 B2 | 11/2009 | Milic-Frayling et al. |
| 7,617,458 B1 | 11/2009 | Wassom, Jr. et al. |
| 7,636,886 B2 | 12/2009 | Wyle et al. |
| 7,720,825 B2 | 5/2010 | Pelletier et al. |
| 7,730,148 B1 | 6/2010 | Mace et al. |
| 7,742,940 B1 | 6/2010 | Shan et al. |
| 7,774,721 B2 | 8/2010 | Milic-Frayling et al. |
| 7,778,976 B2 | 8/2010 | D'Souza et al. |
| 7,861,166 B1 | 12/2010 | Hendricks |
| 7,865,817 B2 | 1/2011 | Ryan et al. |
| 7,895,229 B1 | 2/2011 | Paknad |
| 7,912,804 B1 * | 3/2011 | Talwar et al. ................. 706/47 |
| 7,962,843 B2 | 6/2011 | Milic-Frayling et al. |
| 8,073,729 B2 | 12/2011 | Kisin et al. |
| 2001/0053967 A1 | 12/2001 | Gordon et al. |
| 2002/0007333 A1 | 1/2002 | Scolnik et al. |
| 2002/0010708 A1 | 1/2002 | McIntosh |
| 2002/0022982 A1 | 2/2002 | Cooperstone et al. |
| 2002/0035480 A1 | 3/2002 | Gordon et al. |
| 2002/0083090 A1 | 6/2002 | Jeffrey et al. |
| 2002/0091553 A1 | 7/2002 | Callen et al. |
| 2002/0091836 A1 | 7/2002 | Moetteli |
| 2002/0095416 A1 | 7/2002 | Schwols |
| 2002/0103680 A1 | 8/2002 | Newman |
| 2002/0108104 A1 | 8/2002 | Song et al. |
| 2002/0119433 A1 | 8/2002 | Callender |
| 2002/0120859 A1 | 8/2002 | Lipkin et al. |
| 2002/0123902 A1 | 9/2002 | Lenore et al. |
| 2002/0143595 A1 | 10/2002 | Frank et al. |
| 2002/0143735 A1 | 10/2002 | Ayi et al. |
| 2002/0147801 A1 | 10/2002 | Gullotta et al. |
| 2002/0162053 A1 | 10/2002 | Os |
| 2002/0178138 A1 | 11/2002 | Ender et al. |
| 2002/0184068 A1 | 12/2002 | Krishnan et al. |
| 2002/0184148 A1 | 12/2002 | Kahn et al. |
| 2003/0004985 A1 | 1/2003 | Kagimasa et al. |
| 2003/0014386 A1 | 1/2003 | Jurado |
| 2003/0018663 A1 | 1/2003 | Cornette et al. |
| 2003/0018693 A1 | 1/2003 | Rosenfeld et al. |
| 2003/0031991 A1 | 2/2003 | Genevie |
| 2003/0033295 A1 | 2/2003 | Adler et al. |
| 2003/0036994 A1 | 2/2003 | Witzig et al. |
| 2003/0046287 A1 | 3/2003 | Joe |
| 2003/0051144 A1 | 3/2003 | Williams |
| 2003/0069839 A1 | 4/2003 | Whittington et al. |
| 2003/0074354 A1 | 4/2003 | Lee et al. |
| 2003/0097342 A1 | 5/2003 | Whittington |
| 2003/0110228 A1 | 6/2003 | Xu et al. |
| 2003/0139827 A1 | 7/2003 | Phelps |
| 2003/0208689 A1 | 11/2003 | Garza |
| 2003/0229522 A1 | 12/2003 | Thompson et al. |
| 2004/0002044 A1 | 1/2004 | Genevie |
| 2004/0003351 A1 | 1/2004 | Sommerer et al. |
| 2004/0019496 A1 | 1/2004 | Angle et al. |
| 2004/0034659 A1 | 2/2004 | Steger |
| 2004/0039933 A1 | 2/2004 | Martin et al. |
| 2004/0060063 A1 | 3/2004 | Russ et al. |
| 2004/0068432 A1 | 4/2004 | Meyerkopf et al. |
| 2004/0078368 A1 | 4/2004 | Excoffier et al. |
| 2004/0088283 A1 | 5/2004 | Lissar et al. |
| 2004/0088332 A1 | 5/2004 | Lee et al. |
| 2004/0088729 A1 | 5/2004 | Petrovic et al. |
| 2004/0103284 A1 | 5/2004 | Barker |
| 2004/0133573 A1 | 7/2004 | Miloushev et al. |
| 2004/0138903 A1 | 7/2004 | Zuniga |
| 2004/0143444 A1 | 7/2004 | Opsitnick et al. |
| 2004/0187164 A1 | 9/2004 | Kandasamy et al. |
| 2004/0193703 A1 | 9/2004 | Loewy et al. |
| 2004/0204947 A1 | 10/2004 | Li et al. |
| 2004/0215619 A1 | 10/2004 | Rabold |
| 2004/0216039 A1 | 10/2004 | Lane et al. |
| 2004/0260569 A1 | 12/2004 | Bell et al. |
| 2005/0060175 A1 | 3/2005 | Farber et al. |
| 2005/0071251 A1 | 3/2005 | Linden et al. |
| 2005/0071284 A1 | 3/2005 | Courson et al. |
| 2005/0074734 A1 | 4/2005 | Randhawa |
| 2005/0114241 A1 | 5/2005 | Hirsch et al. |
| 2005/0144114 A1 | 6/2005 | Ruggieri et al. |
| 2005/0149307 A1 | 7/2005 | Gurpinar et al. |
| 2005/0160361 A1 * | 7/2005 | Young .......................... 715/513 |
| 2005/0165734 A1 | 7/2005 | Vicars et al. |
| 2005/0187813 A1 | 8/2005 | Genevie |
| 2005/0203821 A1 | 9/2005 | Petersen et al. |
| 2005/0203931 A1 | 9/2005 | Pingree et al. |
| 2005/0240578 A1 | 10/2005 | Biederman, Sr. et al. |
| 2005/0246451 A1 | 11/2005 | Silverman et al. |
| 2005/0283346 A1 | 12/2005 | Elkins, II et al. |
| 2006/0036464 A1 | 2/2006 | Cahoy et al. |
| 2006/0036649 A1 | 2/2006 | Simske et al. |
| 2006/0074793 A1 | 4/2006 | Hibbert et al. |
| 2006/0095421 A1 | 5/2006 | Nagai et al. |
| 2006/0126657 A1 | 6/2006 | Beisiegel et al. |
| 2006/0136435 A1 | 6/2006 | Nguyen et al. |
| 2006/0143248 A1 | 6/2006 | Nakano et al. |
| 2006/0143464 A1 | 6/2006 | Ananthanarayanan et al. |
| 2006/0149407 A1 | 7/2006 | Markham et al. |
| 2006/0149735 A1 | 7/2006 | DeBie et al. |
| 2006/0156381 A1 | 7/2006 | Motoyama |
| 2006/0156382 A1 | 7/2006 | Motoyama |
| 2006/0167704 A1 | 7/2006 | Nicholls et al. |
| 2006/0174320 A1 | 8/2006 | Maru et al. |
| 2006/0178917 A1 | 8/2006 | Merriam et al. |
| 2006/0184718 A1 | 8/2006 | Sinclair |
| 2006/0195430 A1 | 8/2006 | Arumainayagam et al. |
| 2006/0229999 A1 | 10/2006 | Dodell et al. |
| 2006/0230044 A1 | 10/2006 | Utiger |
| 2006/0235899 A1 | 10/2006 | Tucker |
| 2006/0242001 A1 | 10/2006 | Heathfield |
| 2007/0016546 A1 | 1/2007 | DeVorchik et al. |
| 2007/0048720 A1 | 3/2007 | Billauer |

(56) References Cited

U.S. PATENT DOCUMENTS

| | | |
|---|---|---|
| 2007/0061156 A1 | 3/2007 | Fry et al. |
| 2007/0061157 A1 | 3/2007 | Fry et al. |
| 2007/0078900 A1 | 4/2007 | Donahue |
| 2007/0099162 A1 | 5/2007 | Sekhar |
| 2007/0100857 A1 | 5/2007 | DeGrande et al. |
| 2007/0112783 A1 | 5/2007 | McCreight et al. |
| 2007/0118556 A1 | 5/2007 | Arnold et al. |
| 2007/0156418 A1 | 7/2007 | Richter et al. |
| 2007/0162417 A1 | 7/2007 | Cozianu et al. |
| 2007/0179829 A1 | 8/2007 | Laperi et al. |
| 2007/0179939 A1* | 8/2007 | O'Neil et al. ............ 707/4 |
| 2007/0203810 A1 | 8/2007 | Grichnik |
| 2007/0208690 A1 | 9/2007 | Schneider et al. |
| 2007/0219844 A1 | 9/2007 | Santorine et al. |
| 2007/0220435 A1 | 9/2007 | Sriprakash et al. |
| 2007/0245013 A1* | 10/2007 | Saraswathy et al. ........ 709/223 |
| 2007/0271230 A1 | 11/2007 | Hart et al. |
| 2007/0271308 A1 | 11/2007 | Bentley et al. |
| 2007/0271517 A1 | 11/2007 | Finkelman et al. |
| 2007/0282652 A1 | 12/2007 | Childress et al. |
| 2007/0288659 A1 | 12/2007 | Zakarian et al. |
| 2008/0033904 A1 | 2/2008 | Ghielmetti et al. |
| 2008/0034003 A1 | 2/2008 | Stakutis et al. |
| 2008/0059265 A1 | 3/2008 | Biazetti et al. |
| 2008/0059543 A1 | 3/2008 | Engel |
| 2008/0070206 A1 | 3/2008 | Perilli |
| 2008/0071561 A1 | 3/2008 | Holcombe |
| 2008/0086506 A1* | 4/2008 | DeBie et al. ............ 707/104 |
| 2008/0091283 A1 | 4/2008 | Balci et al. |
| 2008/0126156 A1 | 5/2008 | Jain et al. |
| 2008/0147642 A1 | 6/2008 | Leffingwell et al. |
| 2008/0148193 A1 | 6/2008 | Moetteli |
| 2008/0148346 A1 | 6/2008 | Gill et al. |
| 2008/0154969 A1 | 6/2008 | DeBie |
| 2008/0154970 A1* | 6/2008 | DeBie ............ 707/200 |
| 2008/0177790 A1 | 7/2008 | Honwad |
| 2008/0195597 A1 | 8/2008 | Rosenfeld et al. |
| 2008/0209338 A1 | 8/2008 | Li |
| 2008/0229037 A1 | 9/2008 | Bunte et al. |
| 2008/0262898 A1 | 10/2008 | Tonchev et al. |
| 2008/0294674 A1 | 11/2008 | Retzlaff et al. |
| 2008/0301207 A1 | 12/2008 | Demarest et al. |
| 2008/0312980 A1 | 12/2008 | Boulineau et al. |
| 2008/0319958 A1 | 12/2008 | Bhattacharya et al. |
| 2008/0319984 A1 | 12/2008 | Proscia et al. |
| 2009/0037376 A1 | 2/2009 | Archer et al. |
| 2009/0043625 A1 | 2/2009 | Yao |
| 2009/0064184 A1 | 3/2009 | Chacko et al. |
| 2009/0094228 A1 | 4/2009 | Bondurant et al. |
| 2009/0100021 A1 | 4/2009 | Morris et al. |
| 2009/0106815 A1 | 4/2009 | Brodie et al. |
| 2009/0119677 A1 | 5/2009 | Stefansson et al. |
| 2009/0150168 A1 | 6/2009 | Schmidt |
| 2009/0150866 A1 | 6/2009 | Schmidt |
| 2009/0150906 A1 | 6/2009 | Schmidt et al. |
| 2009/0157465 A1 | 6/2009 | Heathfield |
| 2009/0193210 A1 | 7/2009 | Hewett et al. |
| 2009/0241054 A1 | 9/2009 | Hendricks |
| 2009/0249179 A1 | 10/2009 | Shieh et al. |
| 2009/0249446 A1* | 10/2009 | Jenkins et al. ............ 726/3 |
| 2009/0254572 A1 | 10/2009 | Redlich et al. |
| 2009/0287658 A1 | 11/2009 | Bennett |
| 2010/0017756 A1 | 1/2010 | Wassom, Jr. et al. |
| 2010/0050064 A1 | 2/2010 | Liu et al. |
| 2010/0057418 A1 | 3/2010 | Li et al. |
| 2010/0070315 A1 | 3/2010 | Lu et al. |
| 2010/0088583 A1 | 4/2010 | Schachter |
| 2010/0250625 A1 | 9/2010 | Olenick et al. |
| 2010/0251109 A1 | 9/2010 | Jin et al. |
| 2011/0106773 A1 | 5/2011 | Smith et al. |
| 2011/0191344 A1 | 8/2011 | Jin et al. |

OTHER PUBLICATIONS

PSS Systems, Inc., Atlas LCC for Litigation, pp. 1-2, www.pss-systems.com (Feb. 2008); PSS Systems, Inc., Map Your Data Sources, www.pss-systems.com (Feb. 200*); PSS Systems, Inc., "PSS Systems Provides Legal Hold and Retention Enforcement Automation Solutions for File Shares, Documentum, and other Data Sources" (Feb. 2008).

PSS Systems, Inc., Preservation Benchmarks for 2007 and Beyond, www.pss-systems.com, pp. 1-3 (2007).

PSS Systems, Inc., "Industry Leader PSS Systems Launches Third Generation of Atlas Legal Hold and Retention Management Software", pp. 1-2, www.pss-systems.com (Aug. 2007).

PSS Systems, Inc., Litigation Communications and Collections, www.pss-systems.com (2006), retrieved online on Dec. 8, 2010 from archive.org, 1 page.

Zhu, et al.; "Query Expansion Using Web Access Log Files"; Lecture Notes in Computer Science, 2005, vol. 3588/2005, pp. 686-695, Springer-Verlag, Berlin, Hedelberg.

Human Capital Mangement; "mySAP ERP Human Capital Management: Maximizing Workforce Potential"; retrieved from archive.org Aug. 18, 2009 www.sap.com, 1 page.

Cohasset Associates, "White Paper: Compliance Requirements Assessment, IBM DB2 Records Manager and Record-Enabled Solutions", Oct. 2004, 54 pgs.

"HEI Records Management: Guidance on Developing a File Plan", JISC infoNet, Jan. 2007, 7 pgs.

Lewis "Digital Mountin—Where Data Resides—Data Discovery from the Inside Out", available at http://digitalmountain.com/fullaccess/Article3.pdf accessed Mar. 13, 2012, Digital Mountain, Inc., 2004, 5 pgs.

Sears "E-Discovery: A Tech Tsunami Rolls in", available at http://www.krollontrack.com/publications/ediscoverybackgroundpaper.pdf, accessed Mar. 13, 2012, National Court Reporters Association, Apr. 2006, 7 pgs.

"Microsoft Computer Dictionary", Microsoft Press, Fifth Edition, 2002, p. 499.

* cited by examiner

Details · History · Related Data Sources · Schedules · Holds & Collections · All Holds & Collections · Plan Templates · Policy Distribution    Documentum - GWM Private...

Data Source Details

| | | | |
|---|---|---|---|
| Name | Documentum - GWM Private Bank | Mapped to Category | Uncategorized |
| ID | Documentum - GWM Private Bank | Custody | Custodial System |
| Description | Documentum - GWM Private Bank | | |

Schedules

| Name | Description | Organization | Event / Trigger | Records Cordinator |
|---|---|---|---|---|
| AUD100_Customer Account Audits | Records that relate to the periodic review and evaluation of customer accounts to audit compliance with internal and external standards and requirements. Excludes records that are part of a final audit report. | GWM-Private Bank US-NYC (US) | Employee termination [terminated_on] | Ross, Alex |
| FUN360_Managed Futures – General | Records related to the internal reporting of the performance of managed futures directed by GFC, the establishment of managed futures funds, planning and activity performed on managed futures, management of managed futures funds, and reporting made to managed futures shareholders by GFC. See FUN380 for Managed Futures – Fund Establishment | GWM-Private Bank US-NYC (US) | Employee termination [terminated_on] | Ross, Alex |

Total Schedules: 2                                      Page: 1

ATLAS

Quick Navigation ▼

My Atlas | Law Library | 📖 | 🏛 | Schedules | Projects | Matters | Reports | Cost | Communications | 📄 | 🔒 | 🗺 Map Administrator, System | Help | Preferences | My Holds | Admin My Tasks | 🔍 Advanced Search

Local Schedules

| | | |
|---|---|---|
| Local Schedule Title | | Data Source [All ▾] |
| Office of Record | | Status [All ▾] |
| Organization | | Country Code [All ▾] |

[ New ]    [ Search ]

▸ Schedule Distribution
☐ Pending schedule propagation [ 10 ] days or longer

| Schedule Title | Admin Org | Records Coordinator | Record | Status |
|---|---|---|---|---|
| Administration (Admin) | Corporate (US) | Administrator, System | 3 Year(s) | Approved |
| AUD100, Customer Account Audits (AUD100) ⓘ | GWM-Private Bank US-NYC (US) | Ross, Alex | 3 Year(s) | Approved |
| AUD100, Customer Account Audits (AUD100) ⓘ | GWM-Private Bank US-NYC (US) | Ross, Alex | 3 Year(s) | Approved |
| AUD100, Customer Account Audits (AUD100) ⓘ | GWM- Private Bank US – Chicago (US) | Mason, Judy | 3 Year(s) | Approved |
| Audit and Compliance (B.S) | CBNA (US) | Administrator, System | | Approved |
| Common Departmental Records (CDR) | Global Wealth Mgmt(GWM) (US) | Administrator, System | 14 Year(s) | Approved |

METHOD AND APPARATUS FOR POLICY DISTRIBUTION

CROSS-REFERENCE TO RELATED APPLICATIONS

This application is a continuation-in-part of U.S. patent application Ser. No. 12/645,351, filed Dec. 22, 2009 now U.S. Pat. No. 8,250,041, the entirety of which is incorporated herein by this reference thereto.

BACKGROUND OF THE INVENTION

1. Technical Field

The invention relates to policy distribution in connection with records retention and records management. More particularly, the invention relates to records retention policy management, records management, and enterprise integration. Still more particularly, the invention concerns building a workflow layer that allows multiple forms of policy propagation between Enterprise Retention Management Systems (ERMs) and Records Management Systems (RMSs).

2. Description of the Prior Art

Corporations use Records Management Systems (RMSs) to fulfill their obligations in preservation of important company records for regulatory compliance and electronic discovery for litigation. Historically, RMSs evolved as departmental solutions, where record classification and disposition policies were set up and maintained locally, i.e. on an RMS instance level. Development of retention policies was perceived as a simple task; and RMSs were not designed to support complex workflows in this area.

However, it turned out that departmental solutions do not satisfy corporate needs for at least the following reasons:

Departments do not have enough domain expertise to come out with proper retention policies. Retention policy is defined by applicable laws, laws need research, and legal knowledge is not the strength for Line Of Business (LOB) employees.

There is a tendency to over-preserve business data, which could have been destroyed otherwise, when it comes to LOB manager's decisions. This leads to an uncontrolled increase of retention periods, resulting in greater legal and compliance risks and electronic discovery and storage costs.

When it comes to electronic discovery, legal departments have to know which documents exist at the enterprise. This cannot be achieved reliably without centralized retention policies followed uniformly on LOB level.

To address these issues, corporations started implementing Enterprise Retention Management (ERM) applications, such as Atlas ERM from PSS-Systems (Mountain View, Calif.). These applications provide a centralized workflow for managing retention schedules for the entire corporation.

However, integration between ERMs and RMSs to achieve automated policy retention policy propagation from ERMs to RMSs proved to be challenging for multiple reasons, some of which are:

RMSs have never been designed to be interoperable, although basic concepts are similar in majority of RMS products. Therefore, it is hard to build a common integration layer on top of them Very often there is no economical sense to implement fully automated integration between RMSs and ERMs. A well designed solution should be able to handle multiple levels of integration, e.g. no integration at all, file exchange, and/or programmatic integration, in uniform fashion providing similar services and process visibility to all participants

SUMMARY OF THE INVENTION

An embodiment of the invention provides an application layer in ERM for the propagation workflow of a managing schedule. In an embodiment, a computer apparatus and computer implemented method for policy distribution provides a Records Management System (RMS) that is configured for setting up and maintaining local record classification and disposition policies. An Enterprise Retention Management (ERM) application comprises a centralized workflow configured for managing retention policies for an entity. An application layer in the ERM comprises a propagation workflow that is configured for managing retention policy integration between the ERM and the RMS. The propagation workflow thus provides automated retention policy propagation from the ERM to the RMS.

BRIEF DESCRIPTION OF THE DRAWINGS

FIG. 5 is a screen-based dialog showing the declaring of a data source as manageable according to the invention;

FIG. 6 is a screen-based dialog showing a combined screen with connector and export file format setup according to the invention;

FIG. 7 is a screen-based dialog showing an event queue with selected "Add" event according to the invention;

FIG. 8 is a screen-based dialog showing a similar screen to that of FIG. 7, but describing an Update retention period event according to the invention;

FIG. 9 is a screen-based dialog that shows allowing user to pick a triggering metadata element name for a combination of data source and local retention schedule according to the invention;

FIG. 10 is a screen-based dialog that shows a local schedule search screen having the ability to filter in the scheduled items which have not been propagated to data sources according to the invention;

FIG. 11 is a screen-based dialog that shows an RMA view of un-propagated PCEs for a particular local retention schedule according to the invention;

FIG. 12 is a screen-based dialog that shows an IT employee dashboard displaying notification about two outstanding propagation tasks for a data source "P8-22" according to the invention.

DETAILED DESCRIPTION OF THE INVENTION

Currently, there is no established practice of integration between ERMs and RMSs. Policy management is performed in a semi-structured fashion, such as via Excel spreadsheets. Once the policies are ready, they are uploaded either manually through the UI or through some kind of import/export utility into Records Management Systems. RMSs are historically developed as departmental solutions and they lack advanced capabilities for policy management as well as ability to consume policy information from a centralized ERM.

A few RMS vendors separated their policy management layer from records management layer, but this can hardly be called an enterprise solution because such a solutions are not designed for interoperability between multiple RMS vendors, which is a necessary requirement for large enterprises where most likely multiple types of RMSs are installed.

A presently preferred embodiment of the invention provides an application layer in ERM for the propagation workflow of a managing schedule.

Record Management Terms

Figure 1:
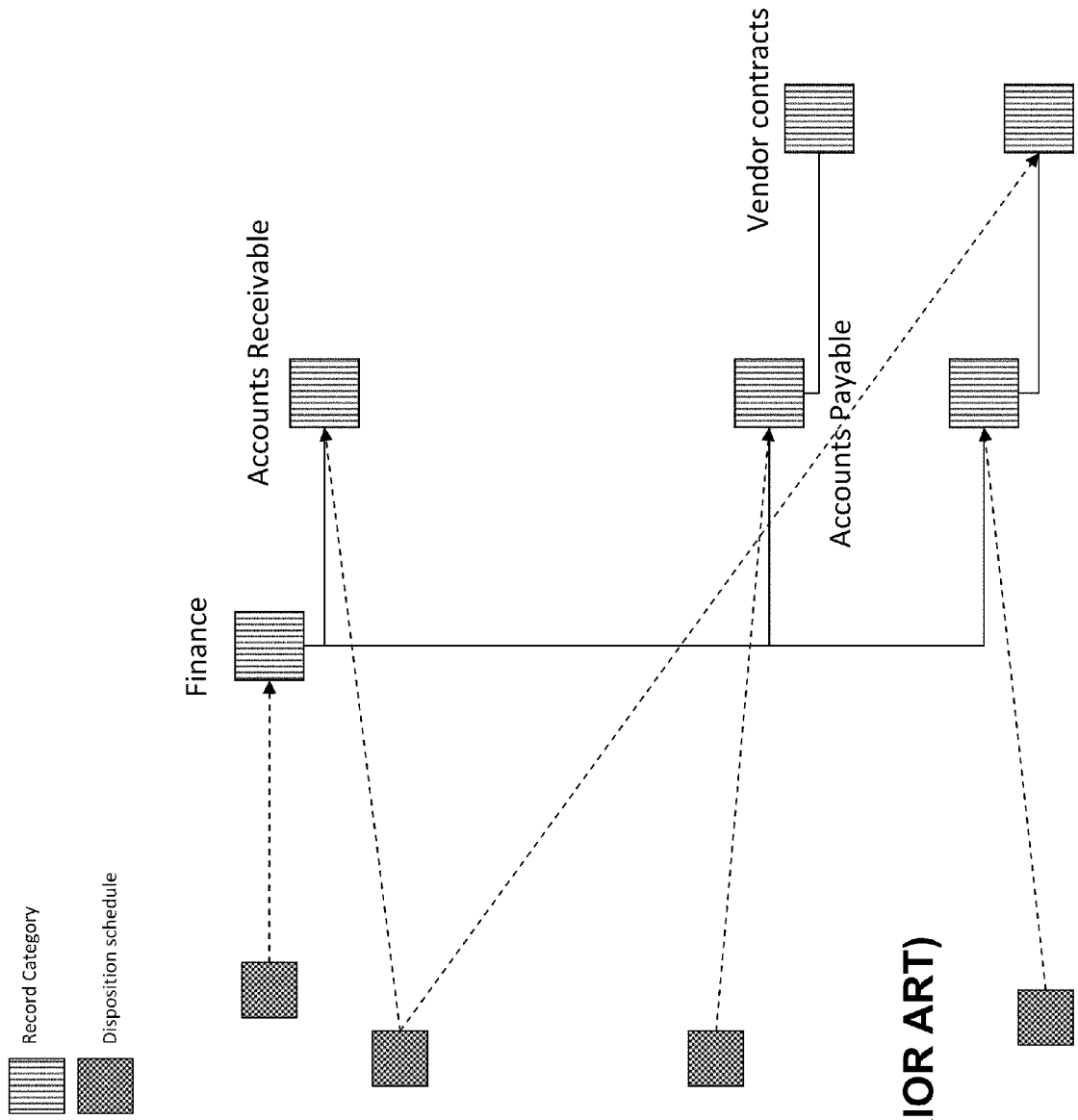
FIG. 1 is a block schematic diagram that shows a record classification hierarchy in a typical RMS.

In general, the entities listed below constitute the hierarchy of records and related metadata. See FIG. 1 for an illustration of their relationships.

Record. For the purpose of this discussion, Records are immutable documents with associated metadata, which need to be preserved for a certain period of time to meet companies' external or internal regulatory obligations.

Records Management System (RMS). An RMS is a system which is designed to store Records. Usually, this is a layer on top of an Enterprise Content Management system.

Record Category hierarchy. This is a hierarchy of record categories set up within an RMS. When a Record is created, it needs to be associated with a node in this hierarchy. A records category tree is usually (but not always) structured by a business function/sub-function, e.g. "Corporate→Finance→Accounts Payable→Vendor contracts."

Disposition schedule (DS). A DS is a set of rules in an RMS which describes when to dispose of the Records. A disposition schedule consists of the following parts: triggering events, i.e. events that trigger the start of retention period counting, e.g. employee termination event starts a four-year retention period for employee-related records; disposition type, e.g. destroy the record automatically once the retention period is over vs. start a manual disposition review process vs. move a document to another archive etc.; and retention period. DSs are associated with Records categories directly or indirectly, e.g. by inheriting the schedules from parent record categories, or can be associated with a record or a collection of records.

Classification (Act of classifying) of a record. When a document is declared as a record, it needs to be "Classified," i.e. associated with a node of a Record Category hierarchy. Once this is done the RMS knows which disposition schedules should be applied to a given record.

Triggering event types. Retention periods are associated with triggering event types. For example, there may be a retention rule "Destroy the record in four years after employee termination," where "employee termination" is an event type. Or, there may be a rule "Destroy a record in five years after record declaration," where record declaration is an event type.

Triggering Event Evaluation Rules (TEERs). Events, such as instances of Event Types, may be communicated to RMS in various ways. For example RMS may consider "Employee termination" event happened if "termination_date" metadata field associated with a given record changed from NULL value to some date value. Or RMS may expect an event to be communicated directly to it by an external application through some kind of API. These algorithms are called TEERs.

File Plan. Within the RMS, the File Plan is a combination of a retention category tree, disposition schedules, and events, which defines how records are stored and disposed of in a given RMS. Also, a File Plan can be understood as some kind of external document which guides how to set up RMS File Plans.

Enterprise Retention Management Terms

Figure 2:
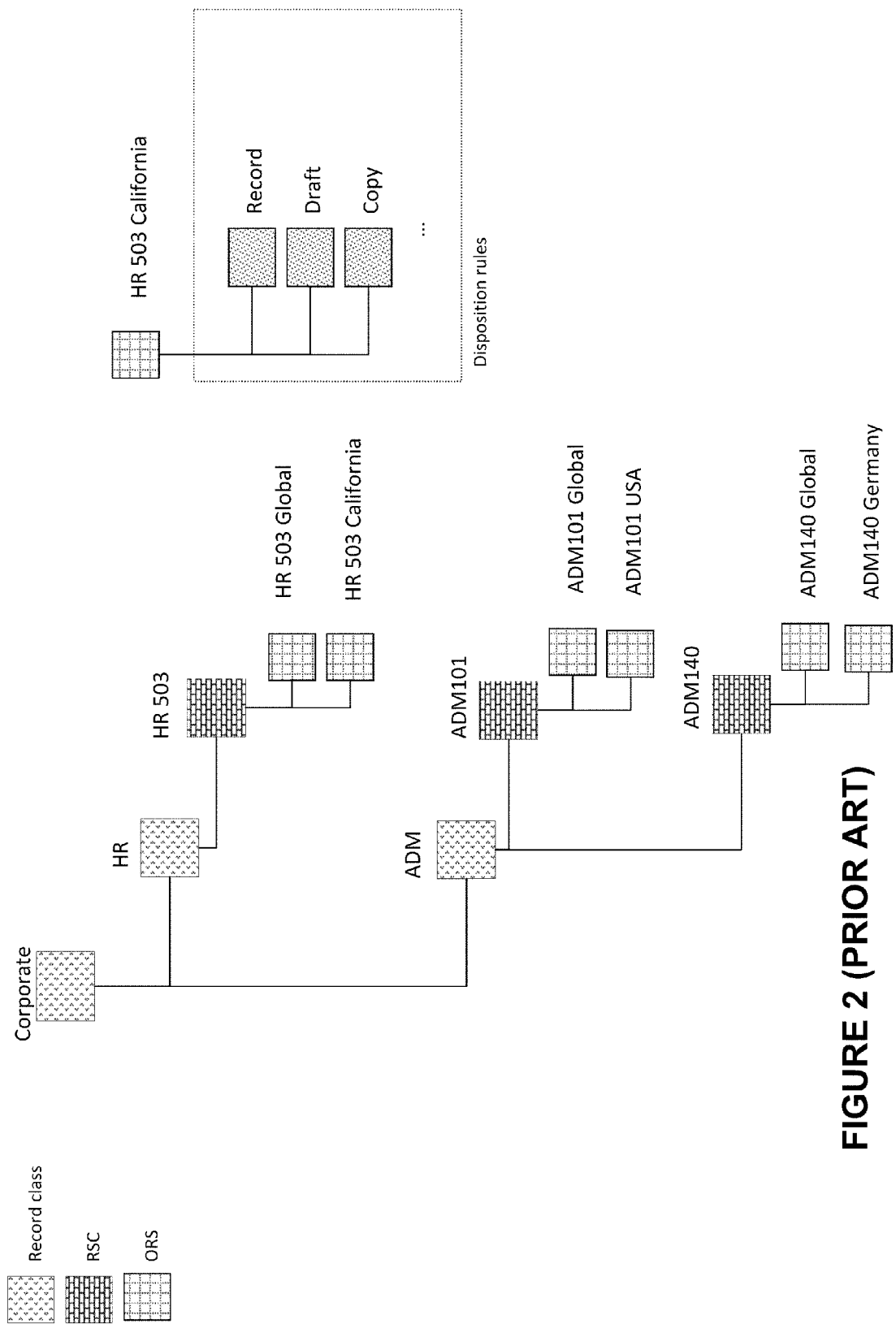
FIG. 2 is a block schematic diagram that shows a retention classification hierarchy in a typical ERM.

In general, the entities described below constitute the classification and metadata of retention (disposition) policies, not records. See FIG. 2 for an illustration of their relationships.

Enterprise Retention Management System (ERM) is a system designed to manage retention (disposition) policies. Such systems usually provide a sophisticated policy management workflow necessary for managing policies at a large enterprise. ERM serves as a source of master data for retention policies. However, the ERM does not store those actual documents to which these policies are applied. This is the business of RMS. A typical ERM is Atlas ERM from PSS-Systems (Mountain View, Calif.).

Although business domains of RMSs and ERMs overlap significantly, the terms they use are somewhat different. This is partially caused by different data models of ERMs and RMSs and partially by the need to solve different business problems.

Record class. This is a hierarchy similar to "Record Categories" in an RMS, structured by business function. However there are a few differences:

This tree is Global, e.g. it spans across the entire corporation, as opposed to a record category tree which maybe relevant only to a given instance of RMS.

This tree defines a higher level of business function (in our example this may be Corporate>Finance). The lower levels are defined differently.

Note that this tree defines classification of retention schedules as opposed to records (in case of RMS).

Organizational hierarchy. This is the hierarchy of corporate organizational units, e.g. "Corporate→Americas→USA→California→Branch 234" or "Bank Corporation 1→Bank XYZ→California→ Investment Banking." Organizational hierarchy usually takes into account geography, corporate entity, and business function.

Organization-Specific Retention Schedule (ORS). These are rules on how to dispose certain types of documents, which are specific to a jurisdiction or internal regulations and are typically associated with an organizational unit. For example, there may be a Corporate-wide ORS for vendor contracts which is applied to all business units dealing with vendor contracts within Finance→Accounts Payable. And, there may be a California-specific ORS which requires vendor contracts to be stored for a longer period of time. The latter ORS applies to all the business units including and below California.

Usually, ORSs are defined on different levels of organization, so that an ORS on a lower level serves as exception to ORSs defined on a higher level. If there is no exception, the higher level ORS is inherited on a lower level of organization. There may be mechanisms of associating an ORS with a particular organization other than inheritance.

Retention schedule code (RSC). This is an aggregation of ORSs which guides the retention for the same type of documents in different organizations within a company. For example, all ORSs that describe vendor contracts in Corporate→Finance→Accounts Payable are united under a single RSC "FAPV-121."

In addition to being an aggregator, an RSC may serve as a template for ORSs, e.g. defining default values. In this case, it makes sense to refer to them as Retention Schedule Templates, but from an RMS integration viewpoint template functionality is not relevant. In fact, an ERM may let the users define the hierarchy of Retention Schedule Templates that serve as templates for various organizations.

Figure 3:
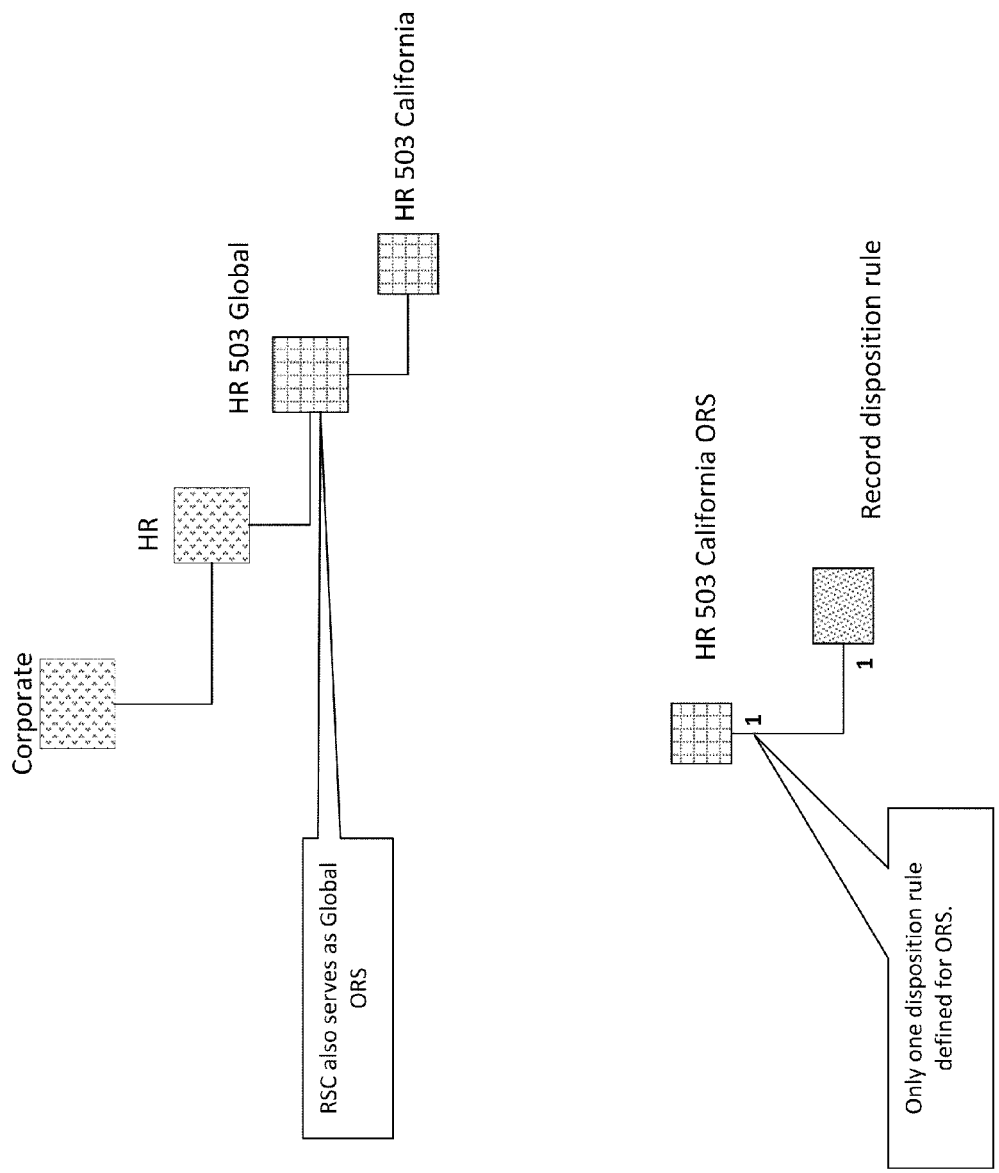
FIG. 3 is a block schematic diagram that shows a number of design alternatives for an ERM retention classification hierarchy.

Note that in certain ERMs, an RSC and a corporate level ORS may be the same entity. See FIG. 3.

Disposition rule. A Disposition Rule is an object describing how and when the document can be disposed of. This is a combination of rule type ("event+time based" vs. "event based" etc.), event type (e.g. employee termination), retention period (e.g. five years) and possibly disposition type (dispose automatically vs. review and dispose etc.) which define the rules of retention for a given ORS. Event type and retention period may be not required for certain rule types. For example, rule type "forever" requires neither event type nor retention period.

Disposition rules are associated with (or are a part of) ORSs. In one embodiment, the same rules may be associated with more than one ORS. Because ERM may describe retention/disposition not only for the records but for non-record documents (such as drafts, copies, etc.), a single ORS can define more than one disposition rule. See FIG. 3.

Note that if an ERM defines only the disposition rules applicable for records (as opposed to copies and drafts), a disposition rule object and ORS may be merged into a single entity.

Business Alias. A Business Alias is a business classification of documents that allows LOB users to perform a record declaration of search without knowing the record class or RSC or ORC IDs/names. A Business Alias can operate with names recognized from their day-to-day business practice. Business Aliases are typically associated with local schedules and (depending on the design of ERM) with data source records in ERM. Data source records point to instances of an RMS.

Data Source. A Data Source is a record in the ERM database describing an instance of an application which stores data. For example an instance of RMS can be described in ERM as a data source. Other examples of data sources are: A file share in a Marketing department, an SAP instance, a SharePoint site in an R&D department in London.

EMBODIMENTS OF THE INVENTION

Data Translation Between ERMs and RMSs

Because the application describes integration between ERMs and RMSs, it would be useful for the reader to understand how record classification data stored in ERMs are translated into File Plan information used by RMSs. See U.S. patent application Ser. No. 12/645,351, filed Dec. 22, 2009, the entirety of which is incorporated herein by this reference thereto.

Roles Involved in Workflow

The following types of users are involved in workflow.

Records Management Administrator (RMA). RMA's role is to:

Create, update, and delete retention policy information in ERM;

Map data sources in ERM to retention schedules; and

Make sure the policies are distributed to data sources. In this embodiment, to RMSs.

The first two tasks are beyond the scope of this application. The third task is discussed in detail herein.

Records Management IT person. This person's role is to make sure the information about new, updated, and deleted policies is propagated to RMSs.

Records Management and IT executives. Their role is monitor the status of policy propagation activities and resolve conflicts, if necessary.

The workflow method described below involves all of these roles.

Policy Distribution Workflow

Multiple Ways of Propagating a Policy

Figure 4:
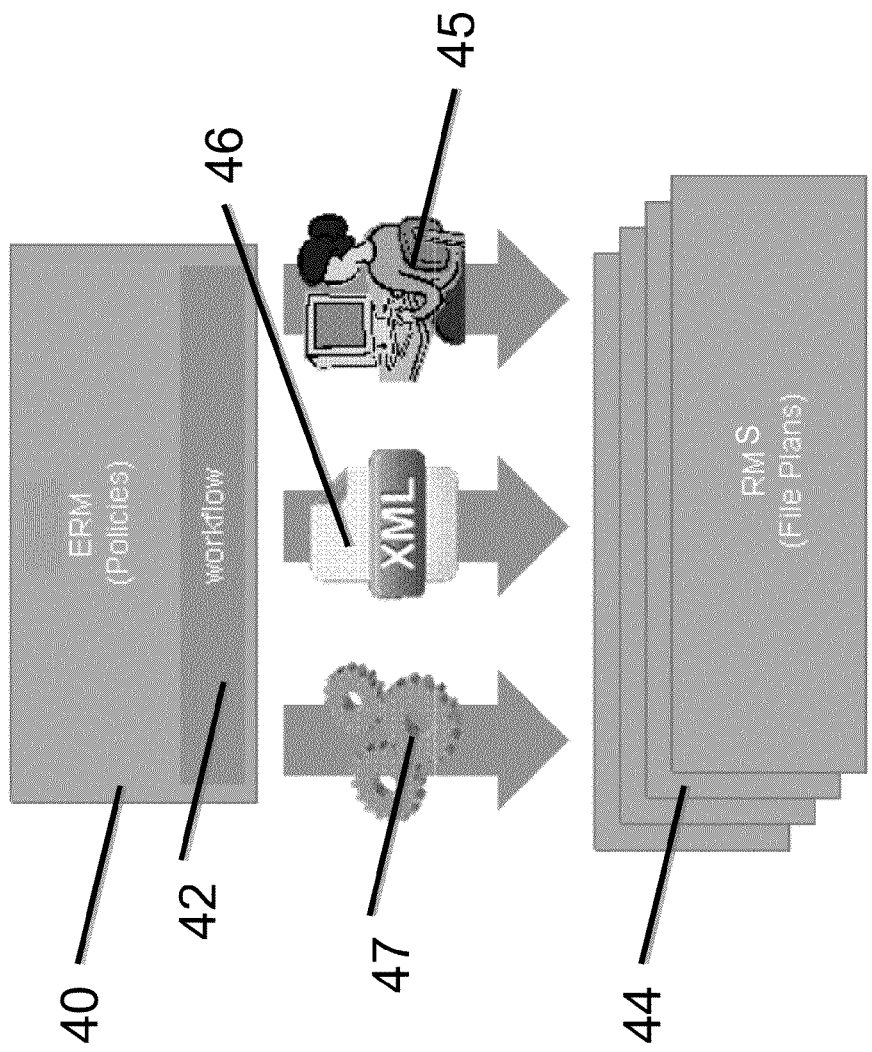
FIG. 4 is a block diagram showing various modes of policy distribution with a common workflow layer on top according to the invention.

FIG. 4 is a block diagram showing various modes of policy distribution with a common workflow layer on top according to the invention. In FIG. 4, an ERM 40 contains policies which must be distributed to the RMS 44, for example as file plans.

Different designs of RMS enable different levels of schedule propagation automation. In certain scenarios there is not enough data to achieve full schedule propagation automation. Deep integration between RMS and ERM is not always financially justified because the amount of change in records classification may be relatively small.

Therefore, an integrated solution should be able to support multiples levels of integration.

These multiple levels of integration are:

Manual 45. There is no direct integration. An ERM user can read the policy information from ERM and make appropriate changes in RMS using its UI.

File Import 46. There is no automatic propagation of policy information. However, an ERM user can export necessary data from ERM in a format understood by RMS import tool and run such a tool providing the exported file as an input.

Fully automated 47. This occurs when data is propagated through an automated channel from ERM to RMS with or without user intervention. There might still be an approval step required to trigger the automated propagation.

Phases

Policy distribution workflows consist of the following distinct phases:

1. Setup. When all the data necessary for workflow operation provided to ERM, and ERM is configured to perform such operations. Also, in this phase policy distribution connectors can be set up.
2. Runtime. When the actual policy distribution process takes place.

Setup. Declaring a Data Source as Manageable

Figure 5:
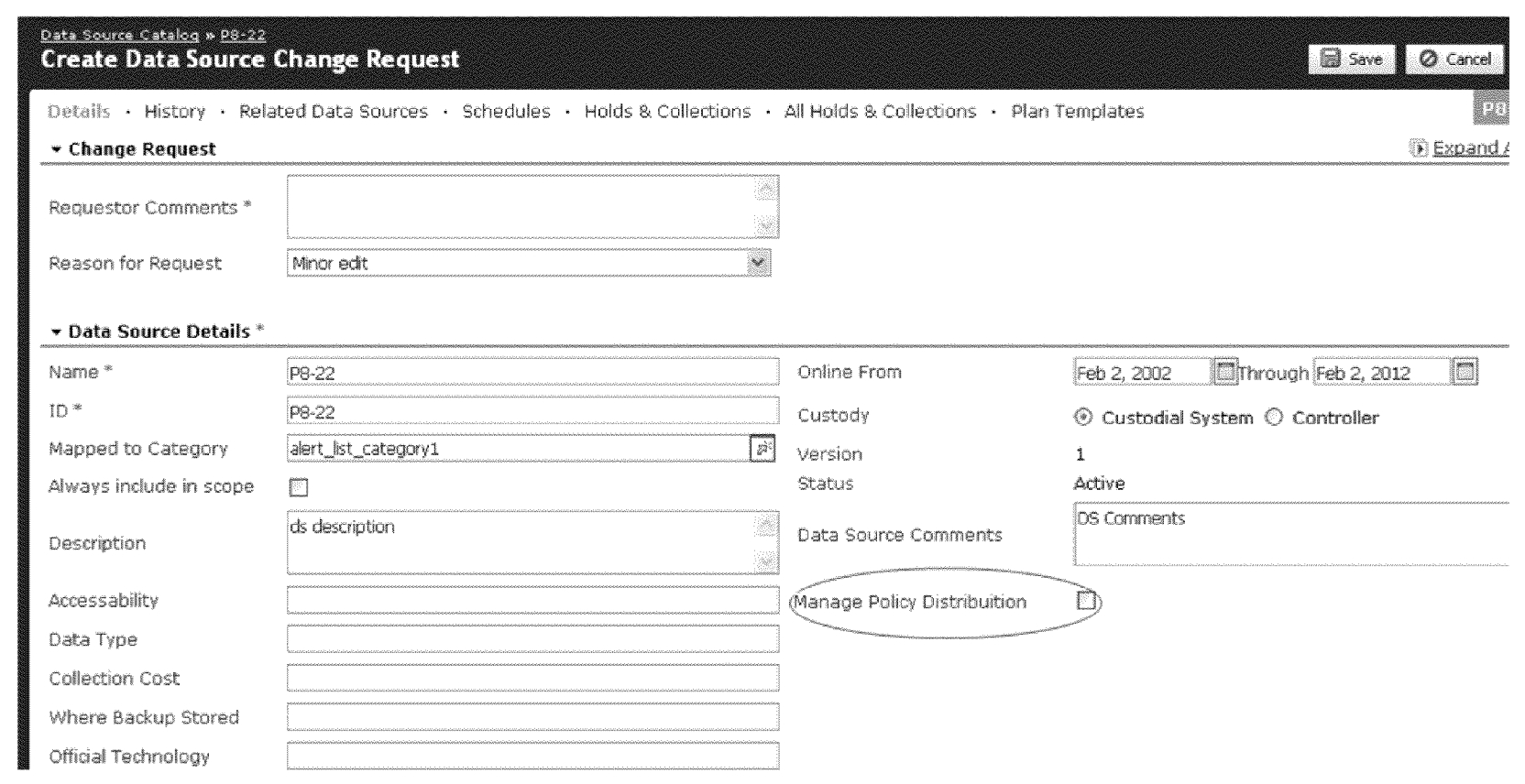

Not all the data sources described in ERM need policy propagation to be managed. In fact, the majority of data sources do not. For example, a file system data source cannot manage its own retention policies. Therefore, a policy propagation management user interface should not be displayed for such a data source. FIG. 5 is a screen-based dialog showing the declaring of a data source as manageable according to the invention.

To declare a data source as manageable, a user who has update privileges against the data source in ERM must set a parameter (flag) on a data source record, which tells ERM that it must manage policy distribution workflow for this data source. After that, the UI needed for managing the policy distribution workflow is displayed to end-users.

Figure 6:
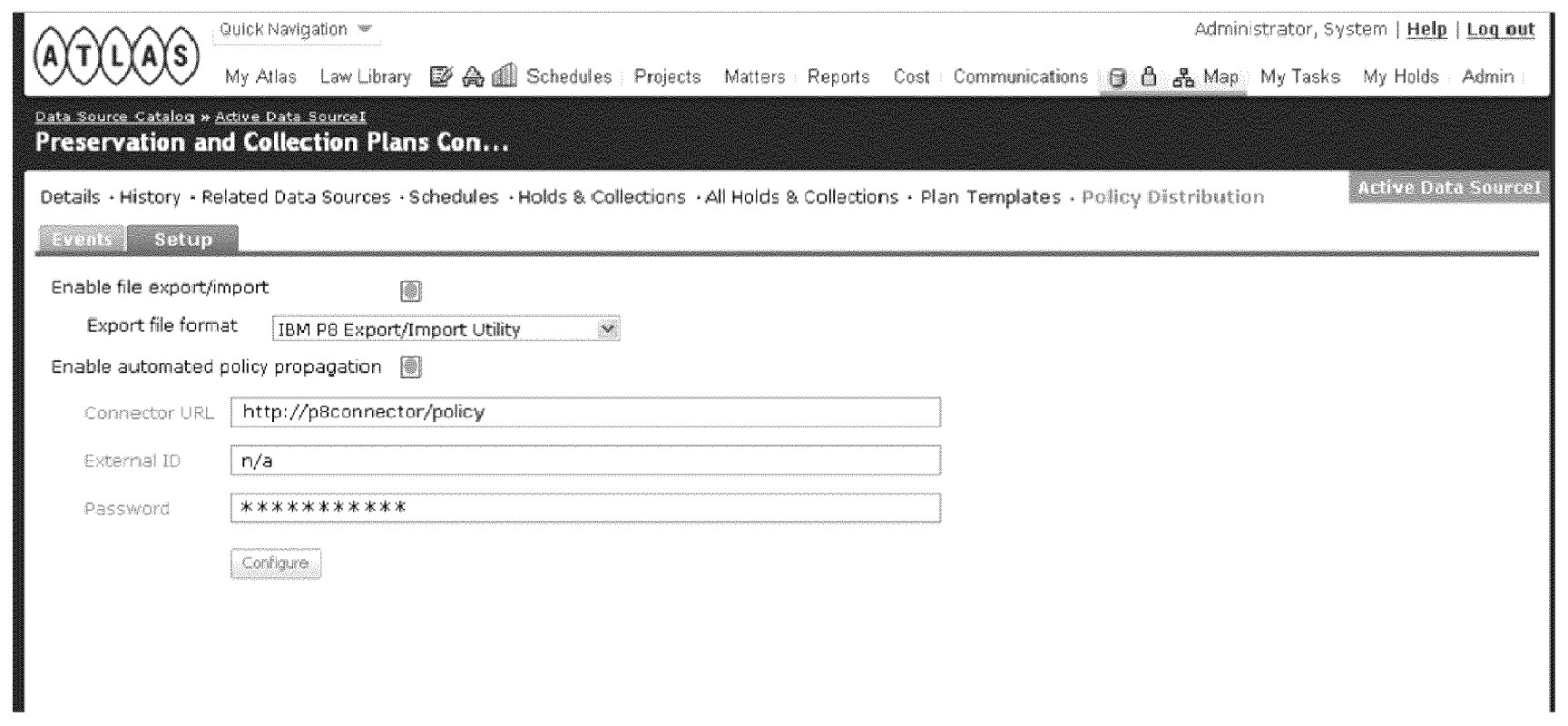

FIG. 6 is a screen-based dialog showing a combined screen with connector and export file format setup according to the invention. Once the data source is declared manageable (see FIG. 5), the following user interface becomes available:

Policy distribution connector setup. Provides the form which allows the user to specify connection information and authentication credentials necessary to communicate with a connector.

File Plan import (or modification) format setup. Provides the means to select the format of import files understood by a particular data source.

IT performer event management queue. Provides the user interface allowing the IT performer to administer policy distribution. More information about this user interface is provided below.

RMA policy distribution management interface. Provides a user interface that allows RMAs to monitor the policy distribution process and interact with IT personnel on policy distribution.

Generating Policy Change Events (PCEs)

An ERM records a PCE each time:

A retention schedule associated with a manageable data source gets changed;

A record class or an RSC got changed and such change needs to be propagated to the RMS, e.g. the record class name has changed, therefore the name of the corresponding record category in RMS must be changed;

A new or existing retention schedule gets associated from a manageable data source;

A retention schedule gets deleted (deactivated) or de-associated from the manageable data source; and A TEER has been changed.

The PCE is represented as one or multiple related records in the ERM database associated with a local retention schedule and with a data source of records and with the object which changed. A goal of the workflow system is to process PCEs. If the PCE is successfully processed, a policy change is considered propagated to the data source.

As described earlier, the user can choose multiple ways to process PCEs. In an embodiment, these are:

Fully manual, where the user interacts with RMS through its user interface;

Through an import script. The user interacts with RMS by running an import utility or uploading an import file another way; and Automated, where the RMS interacts with RMS through programmatic integration.

PCEs are strongly typed, meaning that the ERM can understand the fact that one PCE is an "add" event and another PCE is an "update" event, and can provide a user interface which is proper for each kind of PCE.

Furthermore, update events may have subtypes, such as:
Metadata element has been updated;
Time period in retention schedule has been updated;
Triggering event type has been updated; and
Name of a local schedule or any or its parents has been updated.

This allows the ERM to:

Provide a finer grained user interface. For example, the ERM may display the old and the new retention periods if the retention periods have been updated, or the ERM may display input fields for TEER setup if the triggering event type has been updated and TEER has not been set up yet;

Provide different propagation behavior. For example, if the change is such that it does not require manual intervention before propagation, e.g. a retention period changed from four to three years, the ERM may propagate the change straight ahead without asking for user approval;

Provide different propagation options. For example, if the underlying policy distribution connector is not capable of propagating a policy name change, the ERM does not display the button "Propagate automatically" to the user.

Figure 7:
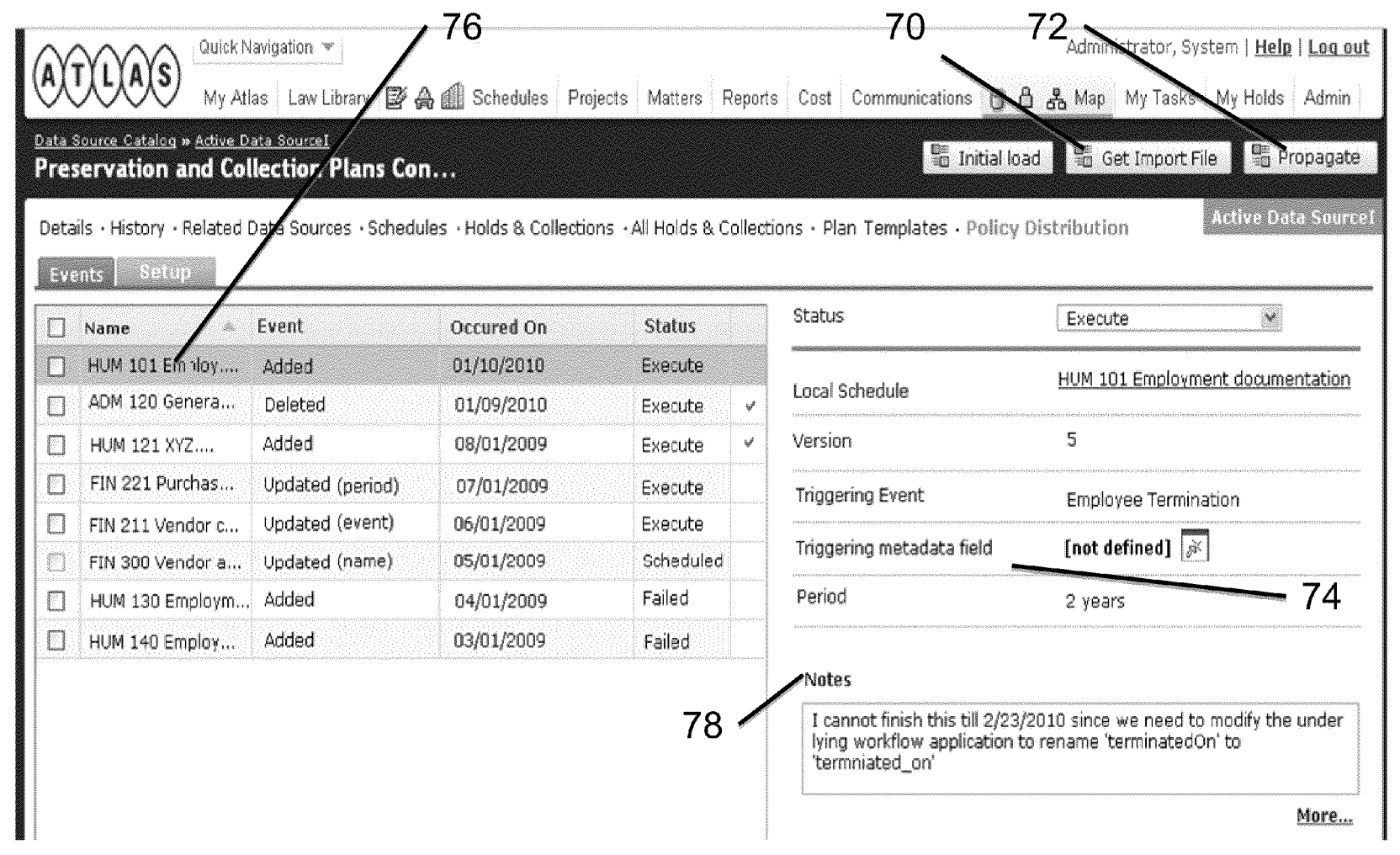

FIG. 7 is a screen-based dialog showing an event queue with selected "Add" event 76. In FIG. 7, TEER needs to be defined 74. Both file import 70 and automated 72 options are. The user can also exchange notes 78.

Figure 8:
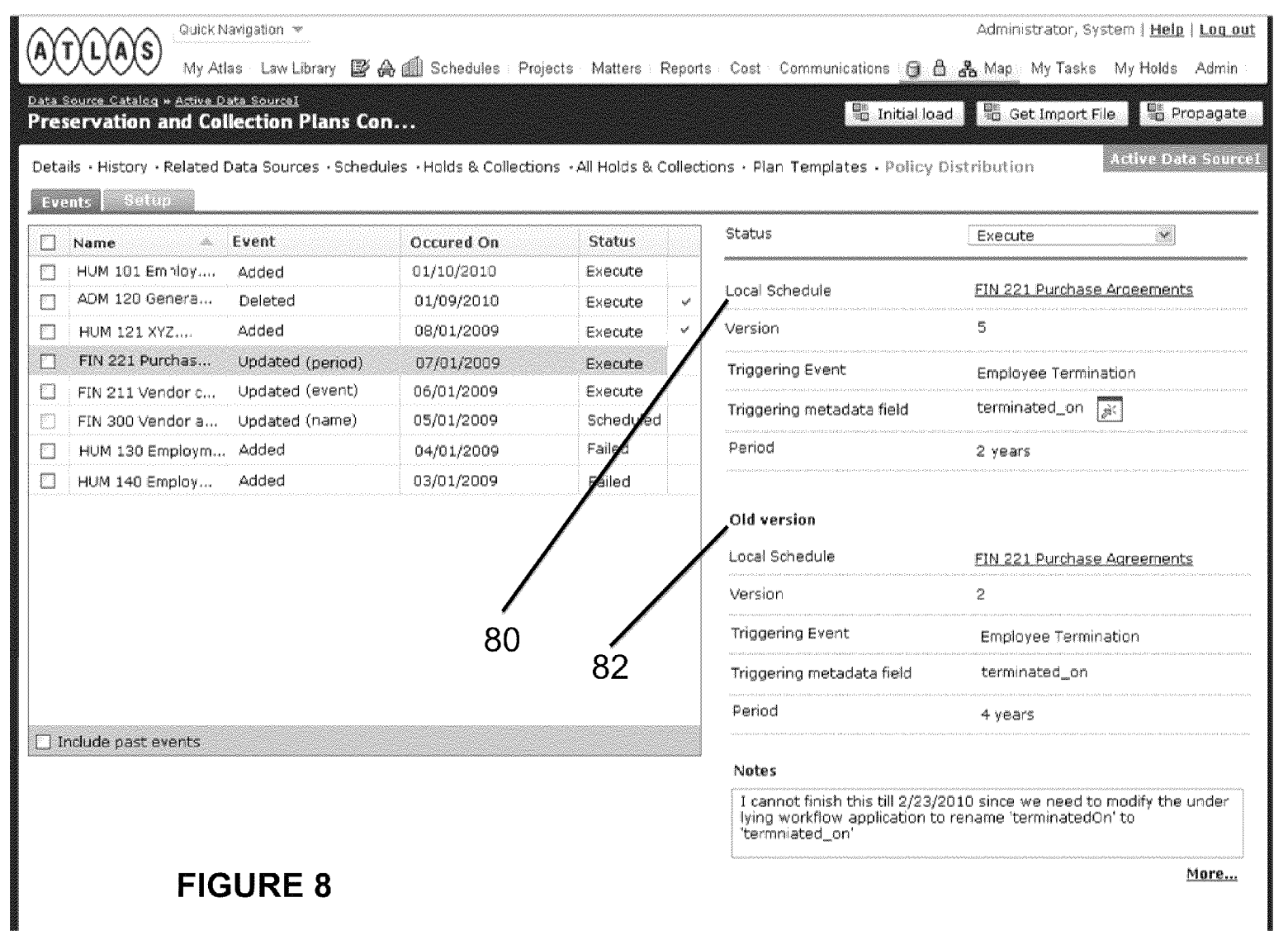

FIG. 8 is a screen-based dialog showing a similar screen to that of FIG. 7, but describing an Update retention period event. Old 82 and new 80 versions of retention schedule are provided for comparison.

IT Performer-Side Event Queue

An IT person who is responsible for propagating policies to data sources sees the list of PCEs as a per-data source PCE queue. The queue management UI may be displayed on a Data Source related screen on the ERM.

The queue UI shows the list of PCEs which are supposed to be processed by the IT person.

The IT person performs the following operations to process PCEs:

Chooses a PCE to process.

Once the PCE is chosen, the UI allows the user to:

1. Provide missing information needed to process the PCE. For example, the user should provide TEER.
2. Export the "Import script," i.e. the file which can be fed into an RMS import tool to propagate the update.
3. Export the "Create script," i.e. the script allowing for initial load of the entire file plan based on the latest information in ERM.
4. Request automatic propagation of event through the connection between ERM and RMS.
5. View the status of previous requests for automatic propagation.
6. Mark a PCE as completed.
7. Communicate with RMA by exchanging notes associated with a PCE.

Handling Multiple Updates on the Same Data Element

It may happen that a subsequent PCE fully overwrites the previous PCE. For example, the first PCE requires changing the retention period from five years to four years and a subsequent PCE requires changing the retention period from four years to three years.

In such situation there is no longer any need to propagate the previous PCE because it is always overwritten shortly thereafter with the subsequent PCE. Therefore, the workflow application detects such PCEs and cancels previous PCEs if they have not been propagated yet or if they have not been yet accepted by integration framework for execution.

In an embodiment, the logic which decides whether a subsequent PCE fully overwrites a previous PCE is as follows:

The PCE is considered overwritten if the same text or numeric attribute has been changed more than once. For example:
A retention period has been changed; and/or
A triggering metadata element name has been changed.

A larger scale change has been performed which makes previous change irrelevant. For example:
The first change involved changing the retention period, but the subsequent change involved changing the triggering event type. For example, the previous event type was "document created" and the new event type is "employee terminated." This change makes the first change obsolete because the change in the triggering event type makes the retention period associated with the previous event type irrelevant.

The first change was related to update of an existing schedule, and the second change requires deletion of the schedule. There is no need to update the schedule if it should be deleted.

From user interface viewpoint, superseded changes may either disappear from the user queue, become disabled, or become marked as superseded (but the user can still choose to propagate them one by one).

Handling Other Dependencies Between PCEs

For data consistency reasons it is useful to make sure that subsequent PCEs are not processed until previous PCEs are processed. To achieve that:

The IT performer's queue management interface might not allow the user to mark PCEs as completed until all the previous PCEs are marked completed.

The application does not allow scheduling of automated PCE propagation for a given PCE until all previous PCEs are marked completed or scheduled for propagation.

If automatic propagation of a previous PCEs failed, the system does not try to propagate the next PCE despite the fact it is scheduled for propagation.

Handling Batch Updates

It is useful for productivity reasons to propagate multiple PCEs at a time through a file import mechanism. To achieve that, ERM allows a user to generate an import file containing changes pertaining to multiple PCEs in the queue.

UI-wise, the ability to handle multiple updates can be implemented as a set of checkboxes next to PCEs in the queue. When the user checks multiple checkboxes, only the selected updates get included into a generated Import file. See FIG. 8.

Initial File Plan load

To set up an instance of RMS, the user must upload a File Plan. ERM does not contain enough information to provision the file plan fully. For example, RMS knows only about the metadata related to disposition, but it does not know about the other metadata which needs to be defined for records. Therefore, it is impossible to automate fully initial provisioning or RMS through ERM integration.

To overcome this difficulty and still provide a certain level of automation, ERM provides a capability to export the entire file plan as an "import file." This assumes that the missing data is imported to RMS either manually, through another import process, or by updating the import file provided by ERM with additional data. The file plan reflects the latest state of record classification hierarchy pertaining to a given data source. UI-wise this is achieved through a button on a data source detail page allowing user to download an import file (see FIG. 7, which shows the initial file export button 70).

Import File Format Definition

ERM can generate multiple formats of the import file. For example, it can generate IBM Filenet P8 Import/Export tool format or similar format for EMC Documentum RMS. The format of the file to be generated can be specified during data source setup in ERM TEER Definition To define the disposition event fully, ERM must be aware of the mechanism which triggers the disposition event, i.e. TEER. For example, if the record is related to employment and the retention schedule is "delete the document in 4 years after employment termination," the TEER may be:

TERMINATED_ON IS NOT NULL

Where "terminated_on" is a metadata field of type "date-time" associated with an employee record. The value of the field is considered a termination date.

When such a rule evaluates to "true", RMS understands that the termination took place and starts counting four years.

Or TEER may be:

TERMINATED_FLAG IS "true"

Where TERMINATED_FLAG is a Boolean metadata element. The date/time at which the change is detected is considered the time of termination.

There are many ways to define TEERs. These may be external events which do not require metadata to be altered, or they can be events which require the entire expression to be evaluated, e.g.:

IS_TERMINATED=true AND TERMINIATION_DATE IS NOT NULL

Different ERM designs allow for different levels of sophistication of TEERs. The minimum level of sophistication requires knowledge of a single metadata field name and always assumes that the event occurred if this field has been modified to a non-NULL value.

In any case, ERM must provide a user interface where the user can define a TEER. This interface is expected to belong to data source editing module and to allow setting up TEERs for existing combinations of data source and retention schedules.

FIG. 9 is a screen-based dialog that shows allowing user to pick a triggering metadata element name for a combination of data source and local retention schedule. In FIG. 9, a page is shown which allows setting up limited "single metadata field" TEERs.

RMA and Management Reporting

RMAs and RMO Management must be able to view the status of PCE propagation. To achieve that, an ERM on policy search screen provides an option to filter in only the schedules which are not propagated to one or another data source. To make sure that only the problematic schedules are displayed, because if the schedule has not been propagated within a day, this is not a problem, the search criteria may define for how long the schedule has not been propagated.

For example, the criteria may be:

"Show only the retention schedules which stay un-propagated for at least 10 days"

Then the user drills down on such a schedule and may see either all of the data sources to which the schedule has not been propagated, or only the data sources to which the schedule has not been propagate for longer than pre-defined number of days.

Users can communicate with IT employees responsible for schedule propagation by exchanging notes associated with PCEs.

IT management may need to understand which data sources have problems with schedule propagation. To achieve that, on data source search field user can restrict the search results to:

Data sources which have some schedules un-propagated; and/or

Data sources which have some schedules un-propagated for longer than a certain period of time.

Drilling down on such a data source allows the user to see the list of schedules that have not been propagated (either all or within certain period of time) and communicate with RMAs and IT employees who are responsible for schedule propagation by exchanging notes associated with PCEs.

Figure 11:
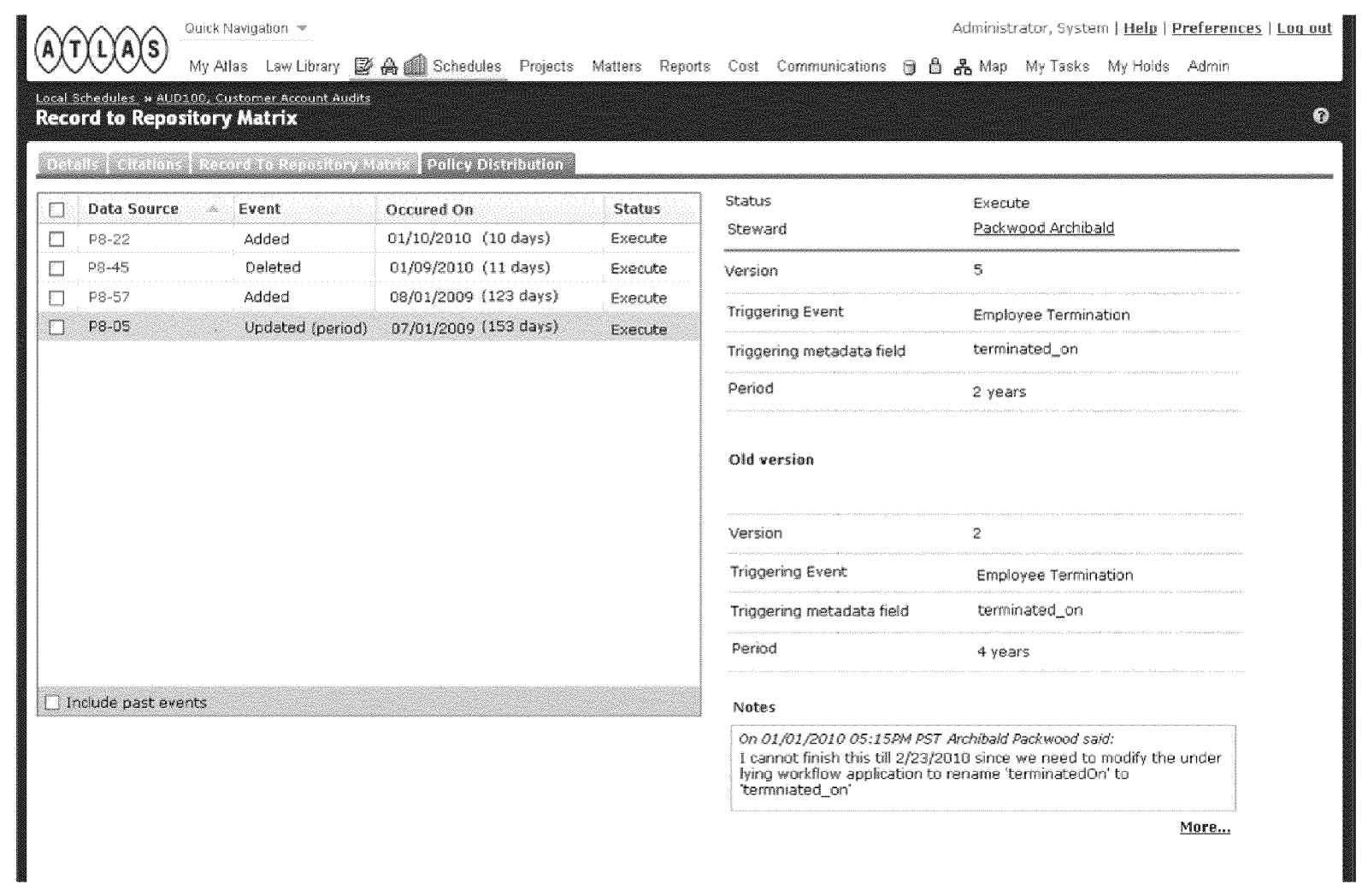

FIG. 10 is a screen-based dialog that shows a local schedule search screen having the ability to filter in the scheduled items which have not been propagated to data sources; and FIG. 11 is a screen-based dialog that shows an RMA view of un-propagated PCEs for a particular local retention schedule.

IT Performer Notifications

IT performers must be notified if there is a schedule propagation task on their plate. However, each data source may require a significant number of PCEs to be processed. Creating one notification message per event quickly floods the dashboard.

To resolve this issue, the following logic may be used:

If the employee dashboard has at least one notification about the PCE that needs to be propagated into a particular data source, do not create another notification. Instead, update the existing notification so it:

Appears on top of the list; and

Contains some textual clue that the scope of task has changed.

Once there are no more PCEs to process for a given data source, clean up the notifications from the employee dashboard related to this data source.

If there are no notifications for a given data source and a new PCE arrived, create such notification.

Figure 12:
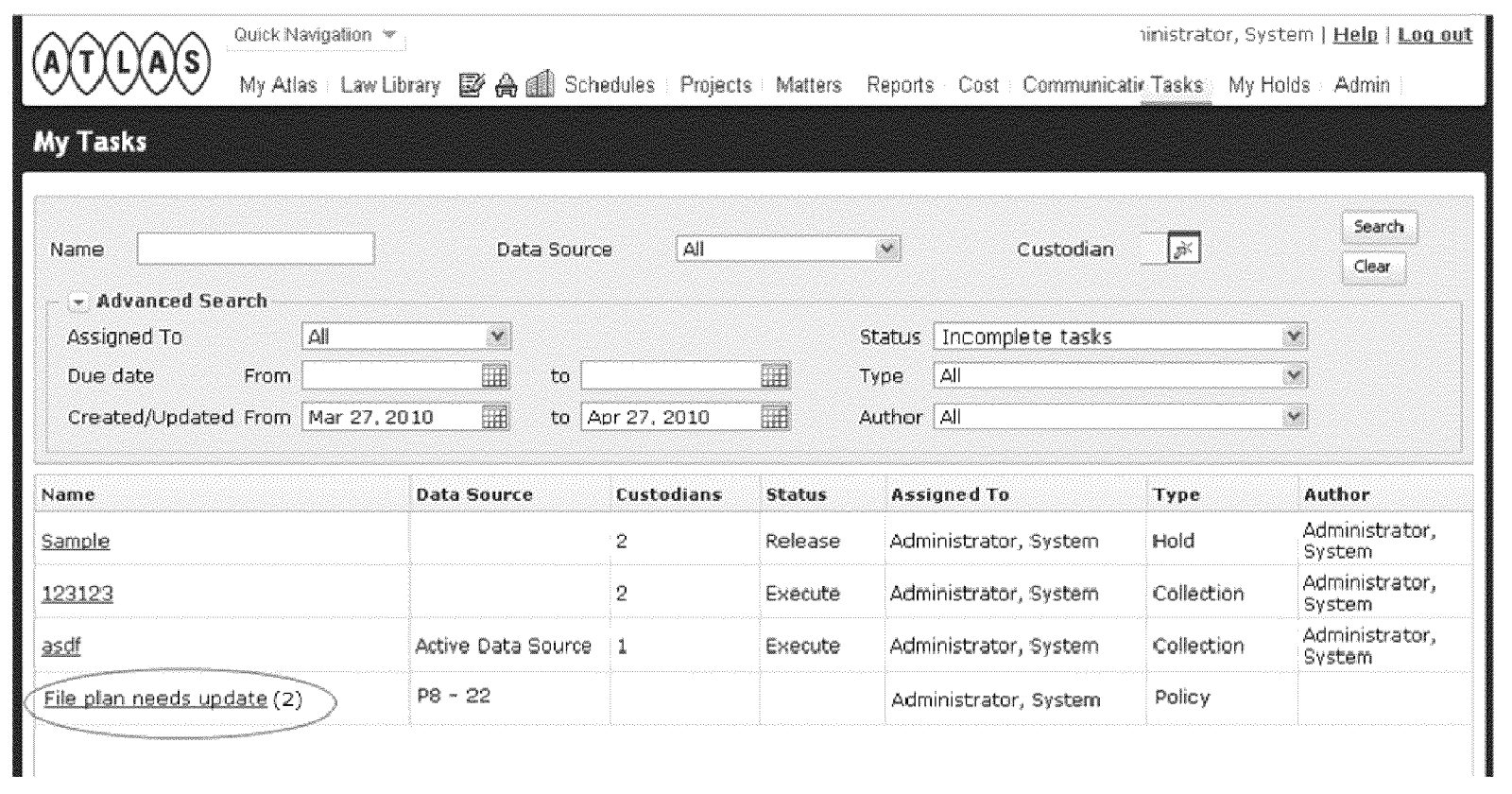

FIG. 12 is a screen-based dialog that shows an IT employee dashboard displaying notification about two outstanding propagation tasks for a data source "P8-22."

RMA and Management Notifications

RMAs and Managers may be notified if a certain local schedule has not been propagated for longer than a certain period. The length of the period may be an ERM level setting, or Role level setting, e.g. 30 days for managers and 10 for RMA; or a profile level setting, e.g. show me all the schedules that have not been propagated for more than ten days; or a schedule level setting, e.g. Notify me if schedule FIN-101 US has not been propagated for more than ten days; or any combination of those.

To avoid flooding the inbox or dashboard the following notification strategies may be implemented:

Let the user disable further notifications. ERM does not send further notifications to the user on the same PCE once further notices are disabled.

Repeat notification only after a certain period of time. For example, the user is notified on an outstanding local schedule after ten days and after twenty days if by that time the schedule is still not propagated.

Automatic Policy Propagation Through Connector

If a PCE has been propagated automatically, ERM changes the event status by itself, as opposed to the user changing the event status in other modes of propagation. Depending on ERM setup, the PCEs which have all the necessary data defined, may be propagated by ERM without user approval. In other setups or ERM designs, automated propagation always requires user approval to trigger the process. If the operation cannot be automated, ERM UI does not display a certain UI control. For example, in case of a deletion of a record category from P8 Data Source, ERM does not display the "Propagate" button, thus requiring user to perform manual deletion. If, for some reason, automated propagation cannot be performed, although ERM considers it possible, the user has an option to choose a different mode of propagation and to change the PCE status manually. In general, the user can always choose a less automated mode of propagation. For example, if the PCE can be propagated by import of a file, the user can always choose to propagate the PCE manually through RMS user interface.

Benefits and Improvements

Embodiments of the disclosed invention provide one or more of the following benefits compared to the status quo:

A realistic design for ERM-RMS integration, where RMSs with different levels of capability can be integrated into a seamless policy distribution process.

Realistic integration scenarios where the enterprise does not need to achieve full integration between ERM and RMS if there is no financial or other justification for doing so.

A way to increase the level of automation gradually, allowing the enterprise to start with non-integrated or loosely integrated scenarios, but still enjoy the benefits of robust business process of policy distribution.

All the stakeholders in the policy distribution process have visibility into the status of policy distribution and the means to communicate with each other once a problem arises.

Addresses a number of edge case scenarios, such as multiple updates or bulk updates, in a uniform fashion to help the user avoid costly mistakes.

Machine Implementation

Figure 13:
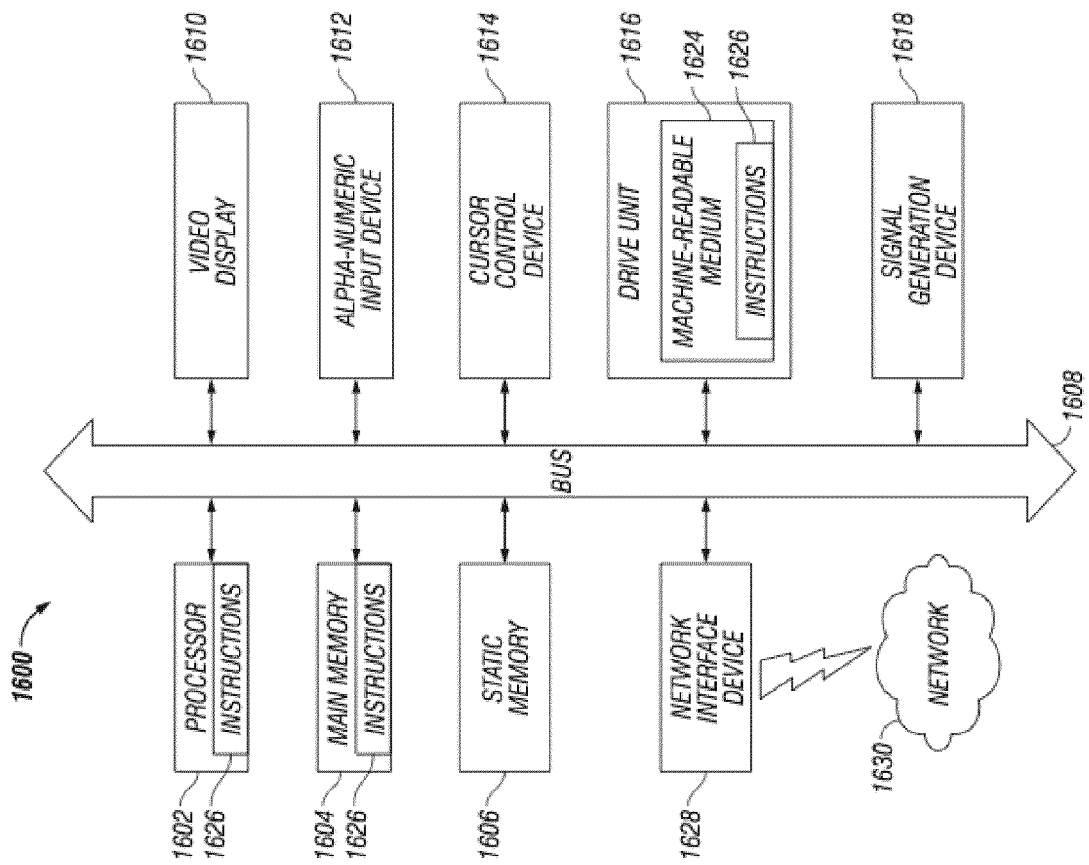
FIG. 13 is a block schematic diagram of a machine in the exemplary form of a computer system within which a set of instructions may be programmed to cause the machine to execute the logic steps of the invention.

FIG. 13 is a block schematic diagram of a machine in the exemplary form of a computer system 1600 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g.

a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for policy distribution, comprising:
   providing a Records Management System (RMS) configured to set up and maintain local record classification and disposition policies;
   providing, by at least one processor, an Enterprise Retention Management (ERM) application comprising a centralized workflow configured to manage retention policies for an entity; and
   providing, by the at least one processor, an application layer in the ERM comprising a propagation workflow configured to manage for managing retention policy integration between the ERM and the RMS;
   wherein the propagation workflow provides automated retention policy propagation from the ERM to the RMS; and
   wherein the propagation workflow is configured to record a policy change event (PCE) in case of a change in at least one of a retention schedule associated with a manageable data source and a Triggering Event Evaluation Rule (TEER).

2. The method of claim 1, wherein the retention policies comprise file plans.

3. The method of claim 1, wherein the application layer is configured to provide multiple levels of integration between the ERM and the RMS, the multiple levels of integration comprising:
   manual integration in which there is no direct integration between the ERM and the RMS, and wherein an ERM user reads policy information from the ERM and makes appropriate changes in the RMS with an RMS UI;
   file import integration in which there is no automatic propagation of policy information, and wherein the ERM user exports necessary data from the ERM in a format understood by an RMS import tool and runs the tool to provide an exported file as an input to the RMS; and
   fully automated integration in which data is propagated through an automated channel from the ERM to the RMS with or without user intervention.

4. The method of claim 1,
   wherein the propagation workflow is configured to provide a setup phase during which all data necessary for workflow operation is provided to the ERM;
   wherein the ERM is configured to perform the workflow operation;
   wherein policy distribution connectors are set up; and
   wherein the propagation workflow is further configured to provide a runtime phase during which policy distribution occurs.

5. The method of claim 1, further comprising:
   providing a screen-based dialog configured to declare a data source as manageable;
   wherein to declare a data source as manageable, a user who has update privileges against the data source in the ERM sets a parameter (flag) on a data source record to instruct the ERM to manage policy distribution workflow for the data source; and
   wherein a user interface (UI) configured to manage the policy distribution workflow is displayed to end-users.

6. The method of claim 5, wherein data sources are not treated as manageable by default; wherein a user makes data sources manageable through UI settings; and wherein the UI becomes available once the data source is declared manageable.

7. The method of claim 6, wherein the UI comprises a policy distribution connector setup user interface comprising a form which allows a user to specify connection information and authentication credentials necessary to communicate with a connector.

8. The method of claim 6, wherein the UI comprises a File Plan import format setup user interface configured to select a format of import files understood by a particular data source.

9. The method of claim 6, wherein the UI comprises an IT performer event management queue user interface configured to allow an IT performer to administer policy distribution.

10. The method of claim 6, wherein the UI comprises an RMA policy distribution management user interface configured to allow an RMA to monitor the policy distribution process and for interacting with IT personnel on policy distribution.

11. The method of claim 1, further comprising:
    providing a screen-based dialog for connector and export file format setup.

12. The method of claim 1, wherein the propagation workflow is configured to record the policy change event (PCE) each time:
    the retention schedule associated with the manageable data source is changed;
    the record class or the retention schedule code (RSC) comprising an ancestor of a retention schedule associated with a data source is changed;
    the new or existing retention schedule is associated from the manageable data source;
    the retention schedule is deleted or de-associated from the manageable data source; and
    the Triggering Event Evaluation Rule (TEER) is changed.

13. The method of claim 12, wherein each of the PCE comprises one or multiple related records in an ERM database associated with a local retention schedule and with a data source of records.

14. The method of claim 12, wherein the propagation workflow is configured to process PCEs; and
    wherein if a PCE is successfully processed, a policy change is considered propagated to an appropriate data source.

15. The method of claim 14, wherein the propagation workflow is configured to process PCEs by any of:
    fully manual processing, where a user interacts with the RMS through a UI;
    through an import script, in which a user interacts with the RMS by running an import utility or uploading an import file; and
    automated processing, where the RMS interacts with the RMS through programmatic integration.

16. The method of claim 12, wherein each the PCEs is typed to define at least one event.

17. The method of claim 16, wherein the event comprises an update event, the update event comprising one or more of the following subtypes:

a metadata element which defines TEER has been updated;
a time period in a retention schedule has been updated;
a triggering event type has been updated; and
a name of a local schedule or any or its parents has been updated.

18. The method of claim 12, wherein the propagation workflow, by processing a PCE, allows the ERM to provide one or more of:
a fine grained UI, in which the ERM may display any of old and new retention periods if the retention periods have been updated and input fields for TEER setup if a triggering event type has been updated and a TEER has not been set up yet;
different propagation behavior, wherein if the change is such that it does not require manual intervention before propagation the ERM may propagate the change straight ahead without asking for user approval;
different propagation options, wherein if an underlying policy distribution connector is not capable of propagating a policy name change, the ERM does not display a button operable to effect propagation to the user.

19. The method of claim 12, further comprising:
providing a list of PCEs as a per-data source PCE queue management UI.

20. The method of claim 19, further comprising the steps of:
a user who is responsible for propagating policies to data sources choosing a PCE to process;
once a PCE is chosen, the queue management UI configured to allow the user to perform one or more of:
provide missing information needed to process the PCE;
export a script which can be fed into an RMS import tool to propagate an update;
export a script that allows for an initial load of an entire file plan based on latest information in the ERM;
request automatic propagation of an event through a connection between the ERM and the RMS;
view status of previous requests for automatic propagation;
mark a PCE as completed; and
communicate with the RMA by exchanging notes associated with a PCE.

21. The method of claim 20, further comprising:
determining whether a subsequent PCE fully overwrites a previous PCE;
wherein the previous PCE is considered overwritten if the same text or numeric attribute has been changed more than once; and
wherein the previous PCE is considered overwritten if a larger scale change has been performed which makes a previous change irrelevant.

22. The method of claim 20, further comprising:
providing a UI configured so that superseded changes may either disappear from a user queue, become disabled, or become marked as superseded, where the user can still choose to propagate the superseded changed one by one.

23. The method of claim 12, wherein when a subsequent PCE fully overwrites a previous PCE and there is no longer any need to propagate the previous PCE because it is always overwritten shortly thereafter with the subsequent PCE, the step of:
detecting the subsequent PCE and canceling the previous PCE if the previous PCE has not been propagated yet or if the previous PCE has not been yet accepted for execution.

24. The method of claim 12, wherein subsequent PCEs are not processed until previous PCEs are processed.

25. The method of claim 12, wherein multiple PCEs at a time are propagated through a file import mechanism.

26. The method of claim 25, further comprising:
providing at UI having a button on a data source detail page configured to allow a user to download an import file.

27. The method of claim 12, comprising:
the ERM minimally defining a disposition event comprising a TEER as having at least a single metadata field name;
wherein the ERM assumes that the disposition event occurred if the metadata field has been modified to a non-NULL value.

28. The method of claim 27, wherein the UI comprises a screen-based dialog that allows a user to pick a triggering metadata element name for a combination of data source and local retention schedule.

29. The method of claim 1, further comprising:
the ERM exporting an entire file plan as an import file, wherein the file plan reflects a latest state of record classification hierarchy pertaining to a given data source.

30. The method of claim 29, wherein the ERM generates multiple formats of the import file based on user operation of a screen-based dialog for connector and export file format setup.

31. The method of claim 30, further comprising:
providing a UI with which a user can define a TEER;
wherein the UI cooperates with a data source editing module to allow setting up TEERs for existing combinations of data sources and retention schedules.

32. A non-transitory computer readable, tangible storage medium programmed to store instructions which, when executed by a processor, perform an operation comprising:
providing a Records Management System (RMS) configured to set up and maintain local record classification and disposition policies;
providing, by at least one processor, an Enterprise Retention Management (ERM) application comprising a centralized workflow configured to manage retention policies for an entity; and
providing, by the at least one processor, an application layer in the ERM comprising a propagation workflow configured to manage for managing retention policy integration between the ERM and the RMS;
wherein the propagation workflow provides automated retention policy propagation from the ERM to the RMS; and
wherein the propagation workflow is configured to record a policy change event (PCE) in case of a change in at least one of a retention schedule associated with a manageable data source and a Triggering Event Evaluation Rule (TEER).

33. An apparatus for policy distribution, comprising:
at least one processor;
a Records Management System (RMS) configured to set up and maintain local record classification and disposition policies;
an Enterprise Retention Management (ERM) application running on the at least one processor and comprising a centralized workflow configured to manage retention policies for an entity; and
an application layer in the ERM comprising a propagation workflow configured to manage retention policy integration between the ERM and the RMS;
wherein the propagation workflow provides automated retention policy propagation from the ERM to the RMS; and wherein the propagation workflow is configured to record a policy change event (PCE) in case:

a retention schedule associated with a manageable data source is changed;

a record class or an RSC comprising an ancestor of the retention schedule associated with the manageable data source is changed;

a new or existing retention schedule is associated from the manageable data source;

the retention schedule is deleted or de-associated from the manageable data source; and a Triggering Event Evaluation Rule (TEER) is changed.

34. The apparatus of claim 33, wherein each of the PCE comprises one or multiple related records in an ERM database associated with a local retention schedule and with a data source of records.

35. The apparatus of claim 34, wherein the propagation workflow is configured to process PCEs by one or more of:

fully manual processing, where a user interacts with the RMS through a UI;

through an import script, in which a user interacts with the RMS by running an import utility or uploading an import file; and automated processing, where the RMS interacts with the RMS through programmatic integration.

36. The apparatus of claim 33, wherein the propagation workflow is configured to process PCEs; and wherein if a PCE is successfully processed, a policy change is considered propagated to an appropriate data source.

* * * * *